United States Patent [19]

Custer

[11] 3,876,296

[45] Apr. 8, 1975

[54] MOTION PICTURE CAMERA, CARTRIDGE & DATA RECORDING SYSTEM

[76] Inventor: Peter Anderson Custer, Newtown, Pa.

[22] Filed: July 2, 1973

[21] Appl. No.: 375,638

[52] U.S. Cl. .................... 352/27; 352/29; 352/72; 352/78 R; 179/100.3 Z

[51] Int. Cl. .................... G03b 31/02

[58] Field of Search .......... 352/26, 27, 28, 29, 30, 352/72, 78; 179/100.32 X

[56] References Cited

UNITED STATES PATENTS

| | | | |
|---|---|---|---|
| 3,176,310 | 3/1965 | Finnerty | 352/72 X |
| 3,442,580 | 5/1969 | Winkler | 352/29 |
| 3,508,817 | 4/1970 | Hnilicka et al. | 179/100.3 Z |
| 3,514,194 | 5/1970 | Ariyasu et al. | 352/27 X |
| 3,522,388 | 7/1970 | Miller | 179/100.3 Z |
| 3,535,469 | 10/1970 | Miller | 179/100.3 Z |
| 3,604,790 | 9/1971 | Land | 352/29 |
| 3,746,438 | 7/1973 | Misawa et al. | 352/29 |
| 3,770,909 | 11/1973 | Rose et al. | 178/6.7 R |

*Primary Examiner*—John M. Horan
*Assistant Examiner*—Alan Mathews
*Attorney, Agent, or Firm*—Fidelman, Wolffe & Leitner

[57] ABSTRACT

A motion picture camera utilizing a cartridge including a data recording system in the cartridge and camera, the cartridge containing film in which a sound loop is formed and a constant speed means driven by a shaft in the camera, the cartridge being provided with an aperture which provides for entry of the drive shaft and an associated data recording device which is connected to data receiving means.

11 Claims, 11 Drawing Figures

MOTION PICTURE CAMERA, CARTRIDGE & DATA RECORDING SYSTEM

BACKGROUND OF THE INVENTION

I. Field of the Invention

The present invention is directed to a motion picture camera having a data recording capability. More particularly, the present invention is directed to motion picture cameras utilizing cartridges wherein a data recording system is provided with the film remaining in the cartridge.

II. Description of the Prior Art

In motion picture film recording, the so-called "super-8" systems have become quite popular for the amateur film maker, as well as professionals, because of their economic advantages. These systems, however, usually lack an ability to record sound on the film together with recording a visual image. The systems, such as the one disclosed in U.S. Pat. No. 3,561,851, have been developed whereby sound may be recorded on the film in a super-8 movie cartridge. However, these systems require the external recording of the sound and this usually requires removal of the film from the cartridge for at least a portion of the length of its travel. The present invention, on the other hand, provides a simple means for data recording on the film in the cartridge and thus provides a quick and direct method of data recording. The term "data" within the scope of the present invention includes sound in the normal sense, but also is to be construed to include any information other than the visual image on the film. Thus, the cartridge recording system can be used when information other than a normal sound is to be recorded, e.g. identifying numbers etc., not just the ambient sound during recording.

Further, the systems of the prior art generally require complicated systems for controlling the recording of the sound so that synchronization of video and audio portions may be obtained. This lack of synchronization obviously would present problems to the home movie maker since he would generally lack the sophistication or means to adjust the recording or to subsequently match up the sound recording with the visual portion of the system.

Therefore, it is an object of the present invention to provide a simple, automatically synchronized means of recording sound on a movie or other film, particularly "super-8" film.

It is a further object of the present invention to provide automatic synchronization of the audio and visual portions of such film.

It is also an object of the present invention to provide a simple, inexpensive and foolproof system for such recording.

Additionally, it is an object of the present invention to provide a cartridge containing film which has both sound and visual recordings thereon and is adaptable for use by duplicators etc. in educational films as well as for television shows.

SUMMARY OF THE INVENTION

The present invention provides a system for recording sound directly on the film of a cartridge. In this system, a sound loop and a constant speed sprocket are provided in the cartridge. The sprocket is driven by a shaft on a device which enters the cartridge through an aperture in the cartridge. Integral with the device is the recording means, which is contained in the camera. The recording means, of course, is connected with a sound-sensing unit e.g. a microphone, and a system for transforming the sound into the desired recordable electric signal. Thus, the present invention provides a simple, relatively inexpensive method of recording sound on a film in a cartridge containing the film. The system allows for recording in any desired manner, e.g. an electromagnetic recording or the exemplary transparent, colorless, ultra-violet fluorescent dye superimposed on a photographic image area and infra-red recording systems disclosed in applicant's copending application Ser. No. 375,812, filed July 2, 1973, and entitled "Motion Picture Film, Soundtrack and Method for Production Thereof", herein incorporated by reference. The provision of the internal sound loop and constant speed sprocket, in combination with the data recording device system, allows for the automatic synchronization of the audio and visual portions as they are recorded. That is, by providing the sound loop, the visual recording and sound recording may be effected simultaneously on selected different positions on the film, e.g. approximately 24 frames or 1 second in time apart.

The present disclosure utilizes the word "sound" to describe recording other than visual. Within the meaning of the present invention, this is to be construed as any data other than a visual image, e.g. the recording can be used in X-ray film cartridges where the X-ray image is recorded on one side of the film and such other data such as shot number, patient's name, age, etc. and any other information can also be stored on the second or sound recording medium. Obviously, some variations in the pick-up, transmission and transformation of the data may be required, depending on its source and nature. Additionally, the system of the present invention is equally applicable to e.g. 8mm, super-8, 16mm and larger films, cameras and cartridges, where cartridge or magazine systems are utilized.

The cartridge may also be used to view and listen to the recorded material. That is, a probe and aperture system for the sound pick-up may be provided in a projector where sound signal detecting means are included in the probe and amplified. Thus, the present cartridge and data recording device system may well be used to both record and play back the material recorded when suitable projectors are provided.

DESCRIPTION OF THE DRAWINGS

In the exemplary drawings of the present invention.

DESCRIPTION OF THE PREFERRED EMBODIMENTS

Figures 1, 2, 3:
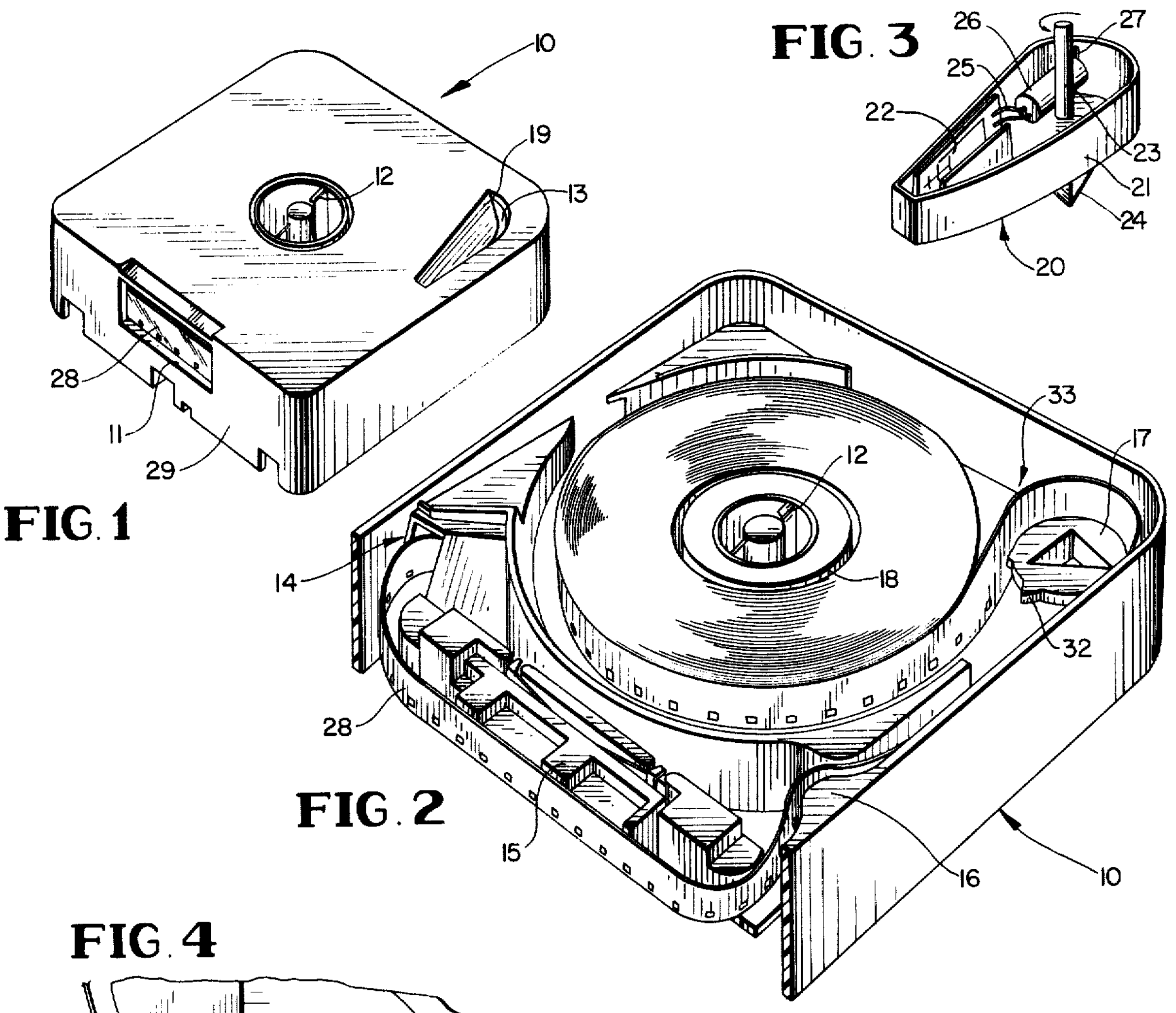
FIG. 1 represents a schematic view of the exterior of the cartridge of the present invention.
FIG. 2 is a partial section of the cartridge of the present invention.
FIG. 3 is a partial section of one of the data recording device of the present invention.
Figure 4:
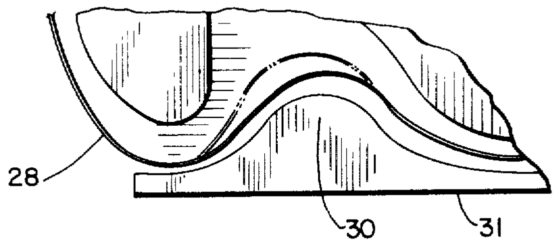
FIG. 4 is a partial view of a sound loop means utilizable in the cartridge of the present invention.

In FIG. 1, a partially schematic view of the cartridge of the present invention is shown. The cartridge 10 has exposing aperture 11, film feed means 12, and a trap door 13 for the entry of the data recording device (to be described later). As shown in FIG. 1 the cartridge 10 has an outer housing including a plurality of outer walls which define the outer dimensions of the cartridge. As shown in FIG. 2, the interior of the cartridge includes feed means 12 being connected to the feed reel (not shown) whereby the film passes from the lower of the two stacked reels through feed point 14 and along exposure controlling means 15, which may be the pawl normally used in motion picture film cartridges, past means 16 for providing the sound loop (as shown in FIG. 4), around constant speed sprocket 17 and onto reel 18. The cartridge 10 further has a plurality of inner walls which together with the outer walls define a film path within the cartridge housing. The constant speed sprocket 17 is below aperture 19, which (as will be described later), is provided for the entry of the data recording device which is used to control the speed of the film during recording of the audio or other data portion on the film. The sound loop damps out the intermittent, or stop-and-start, motion of the film required for exposure and/or projection and acts in conjunction with the constant speed sprocket, which is driven at a fixed velocity, e.g. 24 frames per second, to enable the almost simultaneous recording of both visual and audio data on the film.

FIG. 3 shows an exemplary data recording device 20. The device 20 has an outer casing 21, sound recording means 22, drive shaft 23 and drive means 24 attached to the shaft. As device 20 enters cartridge 1, drive means 24 is positioned and engages constant speed sprocket 54 whereby, when the camera is operated, a constant linear motion of the film is obtained. The sound recording means 22 is shown as a gallium arsenide infra-red light emitting diode, but as noted above, may be e.g. a magnetic recording head, etc., depending on the film utilized. The diode is excited by an electrical signal through wires 25 which are connected to sound pick-up and transformation means (not shown). In this preferred embodiment, the diode 26 emits infrared radiation through slit 27 and records on the infrared sensitive emulsion of film 28 in the cartridge. The data recording emulsion and system for the utilization thereof is disclosed in the above noted copending application. However, the present system is adaptable for use in systems such as electromagnetic recording systems where the gallium arsenide diode in the exemplary preferred mode of the present invention is replaced by a magnetic recording head, and the position of the data recording device is slightly adjusted so that light contact (ordinarily required in electromagnetic recording) between the film and the sound-recording head is provided. Thus, the embodiment of the present invention operates in the same manner as a normal recording system and may utilize the normal edge recording signal where provision is made for the development of the exposed film without destruction of the recorded audio portion on the film. However, by the present invention, a system for recording data, e.g. sound on a film inside a cartridge is provided. The sound recording means, i.e. recording head, diode, etc., enters the cartridge and thus expensive and complex equipment for film feeding, removal and re-entry into the cartridge is not needed.

Referring to FIGS. 1 and 4, exposure controlling means 15 controls the position of film 28 as it passes toward outside edge 29 of the cartridge. To provide the sound recording features of the present invention, protrusion 30 is provided in the casing 31 of the cartridge. This protrusion may be, as shown, a solid molded part or may be hollow or may be of any other design so long as it provides the required flexibility of film position which allows for the intermittent motion required for visual recording and playback and the constant motion required for sound recording. The phantom of the film in FIG. 4 indicates a variation in position of film 28 in the sound loop. Provision of the constant speed sprocket 17 and sound loop in the film at the locations described, i.e. when looking downward at the cut-away section of the cartridge, in the lower left and lower right hand corners of the cartridge when the exposure aperture is to the left, automatically synchronizes the audio and visual portions of the recording system. That is, the simultaneous exposure of the film for the visual image and recording of the audio portion at a distance of e.g. 24 frames ahead of the image, may be accomplished. In this manner, the frame distance between the two recordings may be selected in accord with the projector to be utilized and no further synchronization is necessary during development or recording. That is, sound projectors normally first visually reproduce a given point on the film and then, at a selected time thereafter, reproduce the audio portion. The present system, by recording in the manner described, allows the desired synchronization by recording in a compatible manner. Of course, the sound reproduction systems would vary, depending on the sound recording system used. If normal mangetic recording were used, then a normal projector would be sufficient but in the preferred embodiment, an ultraviolet light source and a photocell, etc. would be needed.

Figure 6:
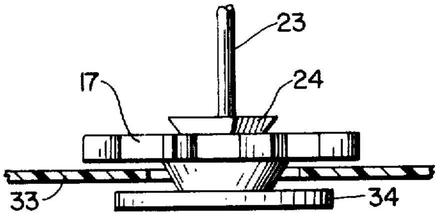
FIG. 6 shows a partially sectioned view of the engagement of the drive with the constant speed sprocket.
Figure 5:
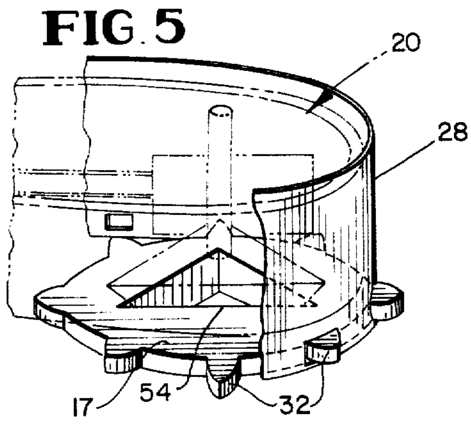
FIG. 5 is a schematic of one constant speed drive sprocket utilizable in the cartridge of the present invention.

In FIG. 5, an enlarged view of constant speed sprocket 17 having a preferred triangular or truncated pyramid drive aperture 50 is shown. Sprocket 17 is driven at a constant speed by means provided in the camera and teeth 32 thereby engage film 28 at a plurality of points during its motion around the sprocket, giving the desired constant speed. In FIG. 6, drive means 24 is shown in the pyramid type shape and very close to engagement with constant speed sprocket 17. Sprocket 17 is mounted in an aperture provided in wall 33 between the upper and lower chambers for the film in the cartridge utilized in the present invention. The sprocket is rotatably positioned by way of mounting means 34, e.g. a bracket. The sprocket, data recording device and drive means are positioned so that correct alignment thereof is obtained by fixing and closing the cartridge in a camera within the scope of the present invention. The converging arcuate surfaces of the contant speed sprocket serve to provide constantly smooth motion of the film without distorting the recording.

Figure 7:
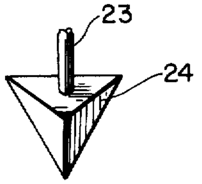
FIG. 7 shows one of the engaging means for the drive of the constant speed sprocket.

FIG. 7 shows the tetrahedral drive means which may be used instead of the pyramid type of drive means shown in FIG. 6. Alternatively, drive means such as a star-shape drive gear may be utilized so long as it is compatible with the aperture in the constant speed sprocket 17, and accurately effects the positioning of the equipment and thus provides the desired recording. Although the constant speed sprocket 17 is illustrated in the preferred embodiment of the present invention, it is to be understood that any known drive linkage, such as pinch rollers, could be employed without departing from the spirit of the invention.

Figure 8:
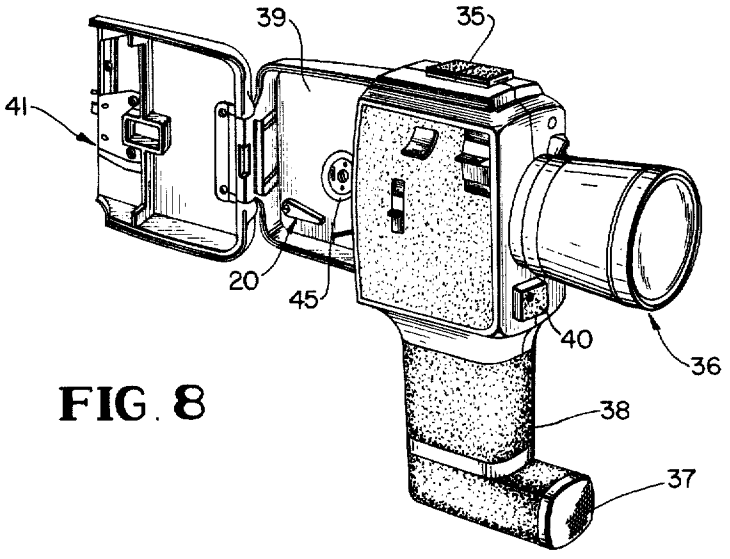
FIG. 8 shows an exemplary camera in accordance with the present invention.

The camera 35 utilized in the present invention shown in FIG. 8 may be the same as any normal, non-sound recording camera with the exception that there must be provision for driving the constant speed sprocket and, of cource, positioning the data recording device in the chamber normally utilized for positioning of the cartridge used in the present invention. Thus, by the provision of appropriate gearing for the normal film drive mechanism, the constant speed drive shaft 23 is available. The camera 35 has conventional leans 36 including such features as aperture and exposure settings, etc. A microphone 37 is mounted at the bottom of pistol grip 38 and may be fixed or removable. Ample sound absorbing material should be present in the grip so as not to record sound generated by the camera mechanism and thus to insure clarity of sound pick-up. Also, the leads from the microphone to a power source if needed (not shown) and an amplifier (not shown) can be contained in the grip 38 of camera 36 or data recording device 20 as discussed above. Data recording device 20 is positioned on plate 39 which serves to hold the gearing shown in FIG. 9 and position cartridge 10. The remainder of the camera is of normal construction and is operated by switch 40 after insertion of cartridge 10, insertion of cartridge 10 into camera 35 and closing of cover 41. This serves to push data recording device 20 through trap door 13 and position the data recording device for recording. When the camera utilized is of the end loading type, then a second motion is normally required to insert the data recording device.

Figure 9:
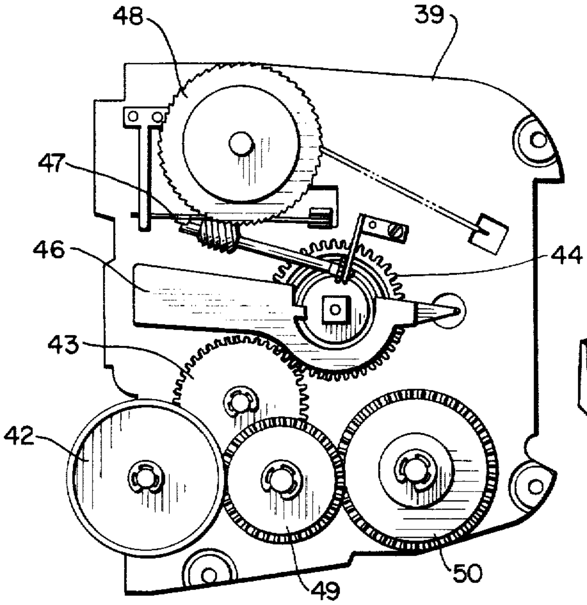
FIG. 9 shows a drive system for the sound recording unit.

The plate 39 shown in FIG. 9 has been removed from camera 35 and inverted to show an exemplary gearing system. In this system, constant speed drive gear 42 drives a variable speed intermediate gear 43 through the clutch system normally used in such cameras (not shown). The intermediate gear 43 then drives film feed gear 44 at which drives film feed means 12 of FIG. 2 through means 45 of the camera shown in FIG. 8. Associated with gear 44 are pointer 46, which indicates the film load in the camera, and counter drive means indicated generally as 47, which drives counter 48. Constant speed drive gear 42 also drives constant speed intermediate sound gear 49 which in turn drives sound gear 50. The sound gear 50 is fixedly attached to shaft 23 (shown in FIGS. 3, 4 and 5) and thus drives constant speed sprocket 17. Wiring for probe 20 (not shown) is passed through holes in plate 39 to data recording device 20 and thus completes the sound recording circuit.

Figure 10:
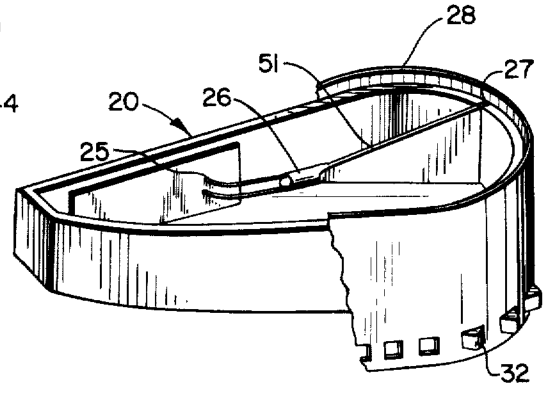
FIG. 10 shows an alternative construction for the data recording device of FIG. 3.

FIG. 10 shows an alternative data recording device 20 wherein diode 26 has a synthetic resin light transmitting structure 51 attached to the surface thereof to channel the light (IR) to slit 27 and record on film 28. Additionally the diode may be made of the correct size and shape and positioned adjacent slit 27 so that no other emission control is needed. Also, a fiber optic bundle may be utilized as opposed to the fiber optic structure shown. In both of these cases, the fiber optic unit is a rod at the beginning and flattens out to the slit shape at the slit. The slit may be dispensed with in this alternative as the fiber optic unit can be positioned adjacent and in contact with the film without distortion of the recording.

Figure 11:
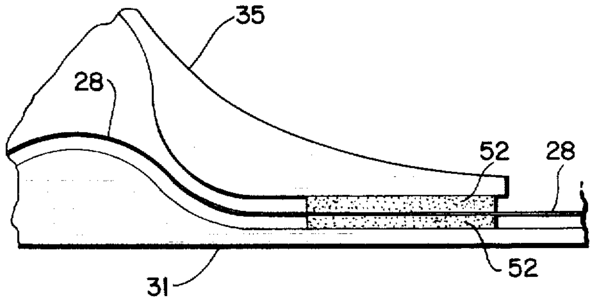
FIG. 11 shows a section of an alternative film control means.

FIG. 11 shows foam inserts 52 which may be used to control film 28 and are positioned adjacent wall 31 and guide means 53 just down stream from the sound loop.

The phantom of data recording device 20 in FIG. 5 is used to show the positioning of the probe in the camera when ready for operation.

Generally, the present invention requires sound deadening in the camera and sealing for light to prevent early exposure of the film. Also, alternative drive means such as pinch rolls for the sound recording system, a solid transparent slit, and other modifications may be provided in the camera without destroying the sense of the invention.

Thus, by the present invention, a means of recording sound within a modified super-8 movie cartridge is provided. The apparatus allows for systems wherein no sound recording is utilized as well as those wherein sound recording is effected. The simple removal of the data recording device would provide the ability to utilize a normal cartridge, while the re-insertion of the data recording device in the camera would allow the use of a sound recordable film which is automatically synchronized. Conversely, the cartridge of the present invention may be utilized in cameras not having provision for sound recording without disrupting the filming as is presently done.

What is claimed is:

1. A film cartridge and a sound recording device for a motion picture camera comprising:

a. a cartridge housing having outer walls which define the dimensions of said cartridge and inner walls which together with said outer walls define a film path within said housing, b. driven means positioned adjacent said film path and adapted to drive film at a constant speed, c. an aperture in one of said outer walls, and d. sound recording means adapted to fit through said aperture and be positioned within said housing, said sound recording means including:

i. drive means positioned to connect with said driven means and including a shaft which extends through said aperture beyond said cartridge housing, ii. a light emitting diode, and iii. a slit in said probe adjacent said diode and said film path and positioned to permit the passage of light from said light emitting diode therethrough.

2. The camera of claim 1 wherein a fiber optic unit is interspaced between said diode and said slit for arranging the emissions of said diode across said slit.

3. The camera of claim 1 wherein a light tube is interspaced between said diode and said slit for arranging the emissions of said diode across said slit.

4. The camera of claim 1 wherein said diode is in contact with said slit and the junction of said diode is the light emitting portion thereof.

5. The film cartridge of claim 1 wherein said driven means is a sprocket.

6. The film cartridge of claim 1 further including means to close said aperture when said sound recording means has been removed.

7. The film cartridge of claim 1 wherein said light emitting diode emits light in the infra-red spectrum.

8. In a motion picture camera including sound recording means in said camera, with sound pick-up means and sound transforming means, and a constant speed drive mechanism, the improvement comprising a film cartridge, and a sound recording device in said camera having:

a. a cartridge housing having outer walls which define the outer dimensions of said cartridge and inner walls which together with said outer walls define a film path within said housing, b. driven means positioned adjacent said film path and adapted to drive film at a constant speed, c. an aperture in one of said outer walls, and d. sound recording means adapted to fit through said aperture and be positioned within said housing, said sound recording means including:

i. drive means positioned to connect with said driven means, and including a shaft which extends through said aperture beyond said cartridge housing and connects with said constant speed drive mechanism;

ii. a light emitting diode, and iii. a slit in said probe adjacent said diode and said film path and positioned to permit the passage of light from said light emitting diode therethrough.

9. The camera of claim 8 wherein said light emitting diode emits light in the infra-red spectrum.

10. The camera of claim 8 wherein said sound pick-up means include a microphone and said sound transforming means include an amplifier.

11. The camera of claim 8 wherein said light emitting diode is electrically connected to said sound recording means.

* * * * *